United States Patent
Subrahmanya et al.

(10) Patent No.: US 8,976,903 B2
(45) Date of Patent: Mar. 10, 2015

(54) **UNIFIED ITERATIVE DECODING ARCHITECTURE USING JOINT LLR EXTRACTION AND *A PRIORI* PROBABILITY**

(75) Inventors: Parvathanathan Subrahmanya, Sunnyvale, CA (US); Andrew Sendonaris, Campbell, CA (US); Jia Tang, Campbell, CA (US); Atul A. Salvekar, San Francisco, CA (US); Shantanu Khare, Chicago, IL (US); Jong Hyeon Park, San Jose, CA (US); Brian C. Banister, San Diego, CA (US); Tao Cui, Durham, CA (US)

(73) Assignee: QUALCOMM Incorporated, San Diego, CA (US)

( * ) Notice: Subject to any disclaimer, the term of this patent is extended or adjusted under 35 U.S.C. 154(b) by 751 days.

(21) Appl. No.: 12/552,673

(22) Filed: Sep. 2, 2009

(65) Prior Publication Data

US 2011/0051831 A1    Mar. 3, 2011

(51) Int. Cl.
*H04L 27/00*  (2006.01)
*H04L 1/06*   (2006.01)
*H04L 1/00*   (2006.01)
*H04L 25/03*  (2006.01)

(52) U.S. Cl.
CPC ........ *H04L 1/06* (2013.01); *H04L 1/005* (2013.01); *H04L 1/0051* (2013.01); *H04L 25/03171* (2013.01)
USPC .......................................... 375/324

(58) Field of Classification Search
USPC .......................................... 375/324
See application file for complete search history.

(56) References Cited

U.S. PATENT DOCUMENTS

| | | | |
|---|---|---|---|
| 6,014,411 A | 1/2000 | Wang | |
| 6,166,667 A | 12/2000 | Park | |
| 7,162,683 B2 | 1/2007 | Bune | |
| 7,222,286 B2 | 5/2007 | Kim | |
| 8,325,863 B2 | 12/2012 | Stamoulis et al. | |
| 2003/0066018 A1 | 4/2003 | Yu et al. | |
| 2004/0258139 A1 | 12/2004 | Namgoong et al. | |
| 2006/0188044 A1* | 8/2006 | Wang et al. | 375/347 |
| 2007/0041475 A1* | 2/2007 | Koshy et al. | 375/340 |
| 2007/0118786 A1 | 5/2007 | Lim et al. | |
| 2007/0140320 A1 | 6/2007 | Banna et al. | |
| 2007/0201632 A1 | 8/2007 | Ionescu | |
| 2007/0230609 A1 | 10/2007 | Hwang et al. | |
| 2008/0069038 A1* | 3/2008 | Yamamoto et al. | 370/328 |
| 2008/0304589 A1 | 12/2008 | Tsuruta et al. | |

(Continued)

FOREIGN PATENT DOCUMENTS

| | | |
|---|---|---|
| CN | 1406415 A | 3/2003 |
| CN | 1838582 A | 9/2006 |

(Continued)

OTHER PUBLICATIONS

Bertrand M. Hochwald and Stephan Ten Brink: "Acheiving Near-Capacity on aMultiple-Antenna Channel" IEEE Transactions on Communications,, vol. 51, No. 3, Mar. 1, 2003, XP002603968.

(Continued)

*Primary Examiner* — Tanmay Shah
(74) *Attorney, Agent, or Firm* — Kevin T. Cheatham

(57) ABSTRACT

Certain aspects of the present disclosure relate to a method and an apparatus for unified iterative demodulation-decoding that can be employed in both multiple-input multiple-output (MIMO) and non-MIMO wireless systems.

34 Claims, 6 Drawing Sheets

(56) References Cited

U.S. PATENT DOCUMENTS

| | | | |
|---|---|---|---|
| 2009/0031185 A1 | 1/2009 | Xhafa et al. | |
| 2009/0052578 A1 | 2/2009 | Sawai | |
| 2009/0067553 A1 | 3/2009 | McElwain | |
| 2009/0154599 A1 | 6/2009 | Siti et al. | |
| 2009/0254797 A1 | 10/2009 | Wu et al. | |
| 2009/0287859 A1* | 11/2009 | Bond et al. | 710/22 |
| 2009/0296842 A1* | 12/2009 | Papadopoulos et al. | 375/260 |
| 2009/0300463 A1* | 12/2009 | Purkovic et al. | 714/755 |
| 2011/0007729 A1 | 1/2011 | Nogami et al. | |
| 2011/0051858 A1 | 3/2011 | Salvekar et al. | |
| 2011/0051860 A1 | 3/2011 | Tang et al. | |
| 2012/0249346 A1 | 10/2012 | Salvekar et al. | |

FOREIGN PATENT DOCUMENTS

| | | |
|---|---|---|
| CN | 201018490 Y | 2/2008 |
| CN | 101183919 A | 5/2008 |
| CN | 101321148 A | 12/2008 |
| CN | 101411086 A | 4/2009 |
| EP | 1217776 A2 | 6/2002 |
| EP | 1432129 A2 | 6/2004 |
| JP | 2000092025 A | 3/2000 |
| JP | 2003504938 A | 2/2003 |
| JP | 2006246341 A | 9/2006 |
| JP | 2008124843 A | 5/2008 |
| JP | 2008533912 A | 8/2008 |
| JP | 2009055228 A | 3/2009 |
| JP | 2009526486 A | 7/2009 |
| TW | I297244 B | 5/2008 |
| WO | WO-0105059 A1 | 1/2001 |
| WO | WO0119013 | 3/2001 |
| WO | WO-2006042326 | 4/2006 |
| WO | WO-2006099267 A2 | 9/2006 |
| WO | WO2007000917 A1 | 1/2007 |
| WO | WO-2007095102 A1 | 8/2007 |
| WO | 2009104582 A1 | 8/2009 |

OTHER PUBLICATIONS

International Search Report and Written Opinion—PCT/US2010/045800—International Search Authority, European Patent Office,Feb. 4, 2011.

International Search Report and Written Opinion—PCT/US2010/045813—International Search Authority, European Patent Office,Jan. 25, 2011.

Liu D N et al: "Low complexity affine MMSE detector for iterative detection-decoding MIMO OFDM systems", IEEE Transactions on Communications, IEEE Service Center, Piscataway, NJ, US, vol. 56, No. 1, Jan. 1, 2008, pp. 150-158, XP011224730.

Ming Zhao et al: "An Iterative Receiver with Channel Estimation for MIMO-OFDM Over a Time and Frequency Dispersive Fading Channel", Global Telecommunications Conference, 2007. GLOBECOM '07. IEEE, IEEE, Piscataway, NJ, USA, Nov. 1, 2007, pp. 4155-4159, XP031196718, DOI: DOI:10.1109/GLOCOM.2007.585 ISBN: 978-1-4244-1042-2.

Partial International Search Report—PCT/US2010/045800—International Search Authority, European Patent Office, Nov. 8, 2010.

Uhlemann E et al: "Packet combining and doping in concatenated hybrid ARQ schemes using iterative decoding", Wireless Communications and Networking, 2003. WCNC 2003. 2003 IEEE Mar. 16-20, 2003, Piscataway, NJ, USA,IEEE LNKD-DOI: 10.1109/WCNC.2003.1200482, vol. 2, Mar. 16, 2003, pp. 849-854, XP010639878.

Wooram Shin et al: "Iterative LMMSE Channel Estimation, Detection, and Decoding with a Priori Information for ST-BICM Systems over Block Fading Channels", 2009 IEEE 69th Vehicular Technology Conference; Apr. 26-29, 2009, Barcelona, Spain, IEEE, Piscataway, NJ, USA, Apr. 26, 2009, pp. 1-6, XP031474572.

Yang Gao et al: "A Novel HARQ Scheme Utilizing the Iterative Soft-information Feedback in MIMO System"I E E V T S Vehicular Technology Conference. Proceedings, IEEE, US, Apr. 1, 2007, pp. 423-424, XP031092664.

Yeong-Luh Ueng et al: "Turbo coded multiple-antenna systems for near-capacity performance" IEEE Journal on Selected Areas in Communications, IEEE Service Center, Piscataway US vol. 27, No. 6' Aug. 1, 2009, pp. 954-964, XP011264538 ISSN: 0733-8716.

Christophe Laot et al., "Turbo Equalization: Adaptive Equalization and Channel Decoding Jointly Optimized", IEEE Journal on Selected Areas in Communications, IEEE Service Center, Piscataway, US, vol. 19, No. 9, Sep. 1, 2001, XP011055452, ISSN: 0733-8716.

Duho Rhee et al., "Iterative Narrowband Jamming Rejection Technique for Coded OFDMA-CDM Systems", Military Communications Conference, 2009, MILCOM 2009, IEEE, IEEE, Piscataway, NJ, USA, Oct. 18, 2009, pp. 1-6, XP031609645, ISBN: 978-1-4244-5238-5.

Tomasoni , Alessandro et al.: "Turbo-LORD: MAP—Approaching Soft-Input Soft-Output Detector for Iterative MIMO Receivers" IEEE Globecom 2007 Proceedings, Global Telecommunications Conference. Piscataway, NJ, USA, (Nov. 1, 2007), pp. 3504-3508, XP031196593, ISBN: 978-1-4244-1042-2.

Siti et al., "A Novel Soft-Output Layered Orthogonal Lattice Detector for Multiple Antenna Communications," IEEE ICC 2006 proceedings, pp. 1686-1691.

Siti, et al., "Layered Orthogonal Lattice Detector for Two Transmit Antenna Communications," In Allerton Conference on Communication, Control and Computing, Sep. 2005, pp. 1-10.

Tomasoni, et. al., "A low complexity turbo MMSE Receiver for W-LAN MIMO Systems," Proceedings of IEEE ICC 2006 [9], pp. 4119-4124.

Kim, Y., et al., "Hybrid MIMO Receiver Using QR-MLD and QR-MMSE," Global Telecommunications Conference, 2009. GLOBECOM 2009. IEEE, Dec. 4, 2009, pp. 1-5.

Taiwan Search Report—TW099128128—TIPO—Jun. 17, 2013.

Yang, T., et al., "Jointly gaussian approximation and multi-stage LLR combining in the iterative receiver for MIMO-BICM systems," Wireless Communications, IEEE Transactions on, Dec. 2008, vol. 7, No. 12, pp. 5250-5256.

Yang, T., et al., "Successive LLR Combining in the Iterative Receiver for MIMO-BICM Systems," Global Telecommunications Conference, 2007. Globecom '07. IEEE, Nov. 30, 2007, pp. 1775-1779.

Li Q., et al., "Improved Turbo Equalization Schemes Robust to SNR Estimation Errors,Achieving near-capacity on a multiple-antenna channel", Jun. 1, 2007,vol. E90-B, No. 6,pp. 1454-1459.

Miki N., et al., "Performance of Multipath Interference Canceller using Soft-Decision Replica Combined with Hybrid ARQ in High Speed Downlink Packet Access", RCS Technical Report of the Institute of Electronics, Information and Communication Engineers, Oct. 13, 2001, vol. 101, No. 371, pp. 99-104, RCS2001-165.

Gang Z. et al., "Strategy Design for LDPCC-HARQ Using Segment Selective Repeat", Journal of Telemetry, Tracking, and Command, Sep. 15, 2008, vol. 29, No. 5, Abstract. 10.

Hatakawa Y. et al., "Proposal of Twin Turbo MIMO-OFDM", Technical Report of the Institute of Electronics, Information and Communication Engineers, Mar. 9, 2007, vol. 106, No. 597, pp. 35-40, IT2006-91, Abstract.

Takahashi Y. et al., "A Study on Time Domain Block Equalizer on MIMO Frequency Selective Channels", Technical Report of the Institute of Electronics, Information and Communication Engineers, Feb. 22, 2008, vol. 107, No. 499, pp. 147-152, WBS2007-102, Abstract.

Uhlemann E. et al., "Hard decision packet combining methods for industrial wireless relay networks," Second International Conference on Communications and Electronics (ICCE), Jun. 4-6, 2008, pp. 104-108.

* cited by examiner

UNIFIED ITERATIVE DECODING ARCHITECTURE USING JOINT LLR EXTRACTION AND *A PRIORI* PROBABILITY

BACKGROUND

1. Field

Certain aspects of the present disclosure generally relate to wireless communications and, more particularly, to a method and an apparatus for unified iterative decoding in multiple-input multiple-output (MIMO) and non-MIMO wireless systems.

2. Background

Current demodulation architectures treat multiple-input multiple-output (MIMO) and non-MIMO wireless systems in different data paths. For example, the log-likelihood ratio (LLR) mapping unit is typically used to process a scalar channel in the case of non-MIMO system, while the symbol equalization (SEQ), the joint LLR extraction or any of its simplified versions such as the Max-Log maximum a posteriori (Max-Log MAP) decoding is employed for processing MIMO channels. Such hardware redundancy wastes implementation area, increases computational complexity and power consumption of a wireless receiver.

Iterative demodulation-decoding structure can be used at the receiver to enhance error rate performance. However, current demodulation architectures do not support unified iterative decoding for both MIMO and non-MIMO wireless systems. On the other hand, a hard/soft serial interference cancellation (SIC) structure supports iterative processing, but this particular scheme works only for MIMO wireless systems.

Therefore, there is a need in the art for a unified iterative demodulation structure that uniformly supports both non-MIMO and MIMO wireless systems.

SUMMARY

Certain aspects provide a method for wireless communications. The method generally includes receiving at least one data stream, wherein each data stream from the at least one data stream was transmitted over a wireless channel, demodulating the at least one data stream using a first set of a priori log likelihood ratios (LLRs) of transmitted bits of the at least one data stream and a channel matrix to obtain a first set of extrinsic LLRs of transmitted bits of the at least one data stream, processing the first set of extrinsic LLRs to obtain a second set of a priori LLRs for decoding, decoding the second set of a priori LLRs to obtain a second set of extrinsic LLRs of transmitted bits of the at least one data stream, and processing the second set of extrinsic LLRs to obtain the first set of a priori LLRs for the demodulation.

Certain aspects provide an apparatus for wireless communications. The apparatus generally includes a receiver configured to receive at least one data stream, wherein each data stream from the at least one data stream was transmitted over a wireless channel, a demodulator configured to demodulate the at least one data stream using a first set of a priori log likelihood ratios (LLRs) of transmitted bits of the at least one data stream and a channel matrix to obtain a first set of extrinsic LLRs of the transmitted bits of the at least one data stream, a first processor configured to process the first set of extrinsic LLRs to obtain a second set of a priori LLRs for decoding, a decoder configured to decode the second set of a priori LLRs to obtain a second set of extrinsic LLRs of transmitted bits of the at least one data stream, and a second processor configured to process the second set of extrinsic LLRs to obtain the first set of a priori LLRs for the demodulation.

Certain aspects provide an apparatus for wireless communications. The apparatus generally includes means for receiving at least one data stream, wherein each data stream from the at least one data stream was transmitted over a wireless channel, means for demodulating the at least one data stream using a first set of a priori log likelihood ratios (LLRs) of transmitted bits of the at least one data stream and a channel matrix to obtain a first set of extrinsic LLRs of the transmitted bits of the at least one data stream, means for processing the first set of extrinsic LLRs to obtain a second set of a priori LLRs for decoding, means for decoding the second set of a priori LLRs to obtain a second set of extrinsic LLRs of transmitted bits of the at least one data stream, and means for processing the second set of extrinsic LLRs to obtain the first set of a priori LLRs for the demodulation.

Certain aspects provide a computer-program product for wireless communications. The computer-program product includes a computer-readable medium comprising instructions executable to receive at least one data stream, wherein each data stream from the at least one data stream was transmitted over a wireless channel, demodulate the at least one data stream using a first set of a priori log likelihood ratios (LLRs) of transmitted bits of the at least one data stream and a channel matrix to obtain a first set of extrinsic LLRs of the transmitted bits of the at least one data stream, process the first set of extrinsic LLRs to obtain a second set of a priori LLRs for decoding, decode the second set of a priori LLRs to obtain a second set of extrinsic LLRs of transmitted bits of the at least one data stream, and process the second set of extrinsic LLRs to obtain the first set of a priori LLRs for the demodulation.

Certain aspects provide a wireless node. The wireless node generally includes at least one antenna, a receiver configured to receive via the at least one antenna at least one data stream, wherein each data stream from the at least one data stream was transmitted over a wireless channel, a demodulator configured to demodulate the at least one data stream using a first set of a priori log likelihood ratios (LLRs) of transmitted bits of the at least one data stream and a channel matrix to obtain a first set of extrinsic LLRs of the transmitted bits of the at least one data stream, a first processor configured to process the first set of extrinsic LLRs to obtain a second set of a priori LLRs for decoding, a decoder configured to decode the second set of a priori LLRs to obtain a second set of extrinsic LLRs of transmitted bits of the at least one data stream, and a second processor configured to process the second set of extrinsic LLRs to obtain the first set of a priori LLRs for the demodulation.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
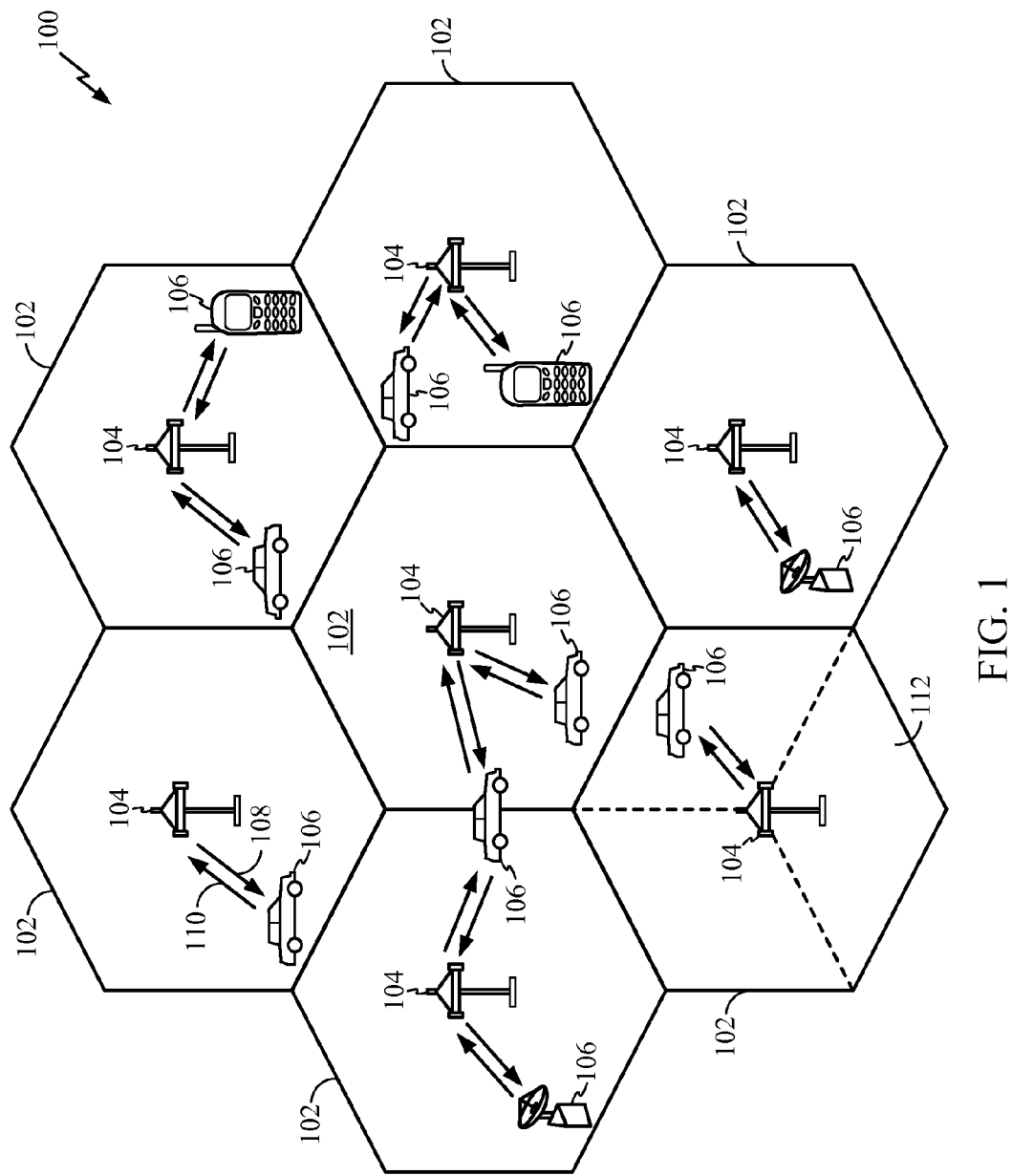
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme and a single carrier transmission. Examples of such communication systems include Orthogonal Frequency Division Multiple Access (OFDMA) systems, Single-Carrier Frequency Division Multiple Access (SC-FDMA) systems, Code Division Multiple Access (CDMA), and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A CDMA system may utilize spread-spectrum technology and a coding scheme where each transmitter (i.e., user) is assigned a code in order to allow multiple users to be multiplexed over the same physical channel. The CDMA system may utilize, for example, Wideband Code Division Multiple Access (W-CDMA) protocol, High Speed Packet Access (HSPA) protocol, evolved Speed Packet Access (HSPA+) protocol, etc.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with CDMA technique. If this is the case, the wireless communication system 100 may be referred to as a CDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
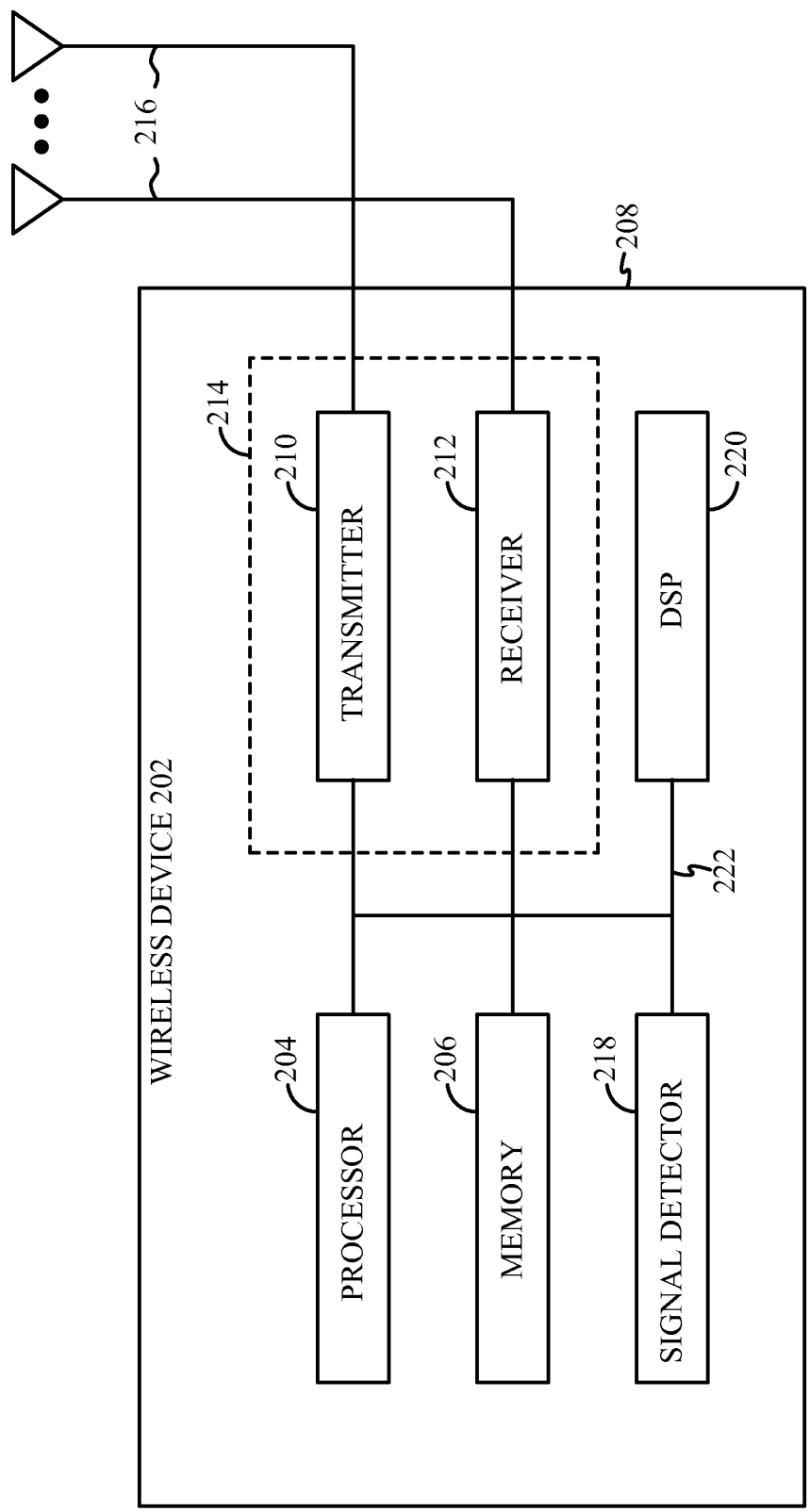
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
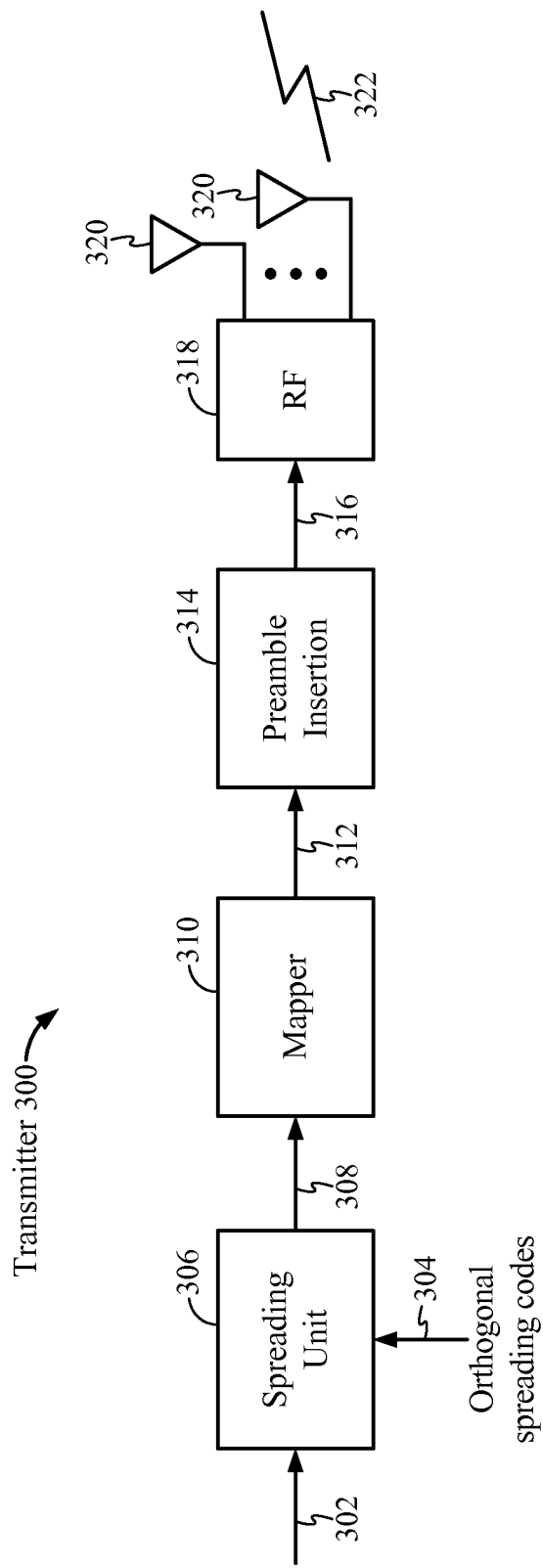
FIG. 3 illustrates an example transmitter that may be used within a wireless communication system in accordance with certain aspects of the present disclosure.

FIG. 3 illustrates an example of a transmitter 300 that may be used within a wireless communication system 100 that utilizes CDMA. Portions of the transmitter 300 may be implemented in the transmitter 210 of a wireless device 202. The transmitter 300 may be implemented in a base station 104 for transmitting data 302 to a user terminal 106 on a downlink 108. The transmitter 300 may also be implemented in a user terminal 106 for transmitting data 302 to a base station 104 on an uplink 110.

Data 302 to be transmitted represent a plurality of signals dedicated to different user terminals 106. Each signal from the plurality of signals may be spread in a spreading unit 306 by corresponding spreading code from a set of orthogonal spreading codes 304. The plurality of spread signals dedicated to different user terminals 106 may be summed to generate a cumulative signal 308. The cumulative signal 308 to be transmitted is shown being provided as input to a mapper 310. The mapper 310 may map the data stream 308 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 310 may output a symbol stream 312, which may represent an input into a preamble insertion unit 314.

The preamble insertion unit 314 may be configured for inserting a preamble sequence at the beginning of the input symbol stream 312, and may generate a corresponding data stream 316. The preamble may be known at the receiver and may be utilized for time and frequency synchronization, channel estimation, equalization and channel decoding. The output 316 of the preamble insertion unit 314 may then be up-converted to a desired transmit frequency band by a radio frequency (RF) front end 318. At least one antenna 320 may then transmit a resulting signal 322 over a wireless channel.

Certain aspects of the present disclosure support a unified iterative decoding architecture that may be incorporated in the receiver 212. The proposed unified iterative receiver structure may be utilized for both multiple-input multiple-output (MIMO) and non-MIMO wireless systems.

Iterative Decoding

Iterative decoding is a technique that can be used to enhance receiver error rate performance. Iterative decoding may comprise two steps that can be performed repeatedly in interleaved fashion. In one step, a posteriori probability for every transmitted bit may be extracted. For example, a posteriori log likelihood ratio (LLR) information may be obtained after certain number of iterations of outer Turbo decoder on one or more data streams. In another step, LLR of every transmitted bit may be generated.

In the very first iteration of the very first MIMO stream, LLRs may be generated directly from the received signal. For subsequent iterations, the extrinsic part of the a posteriori LLRs along with the received signal may be used to generate new LLRs for the next iteration.

Figure 4:
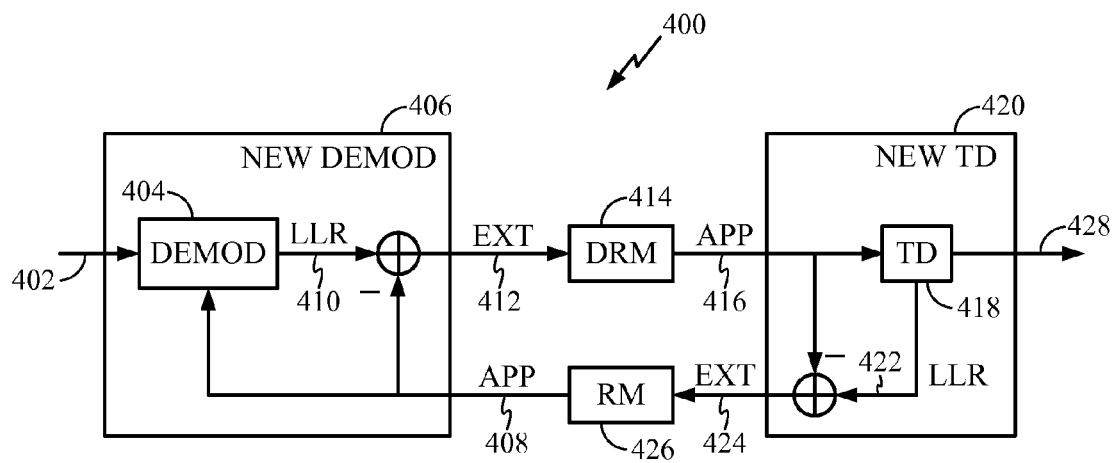
FIG. 4 illustrates an example receiver with iterative demodulation-decoding structure that may be used within a wireless communication system in accordance with certain aspects of the present disclosure.
Figure 5:
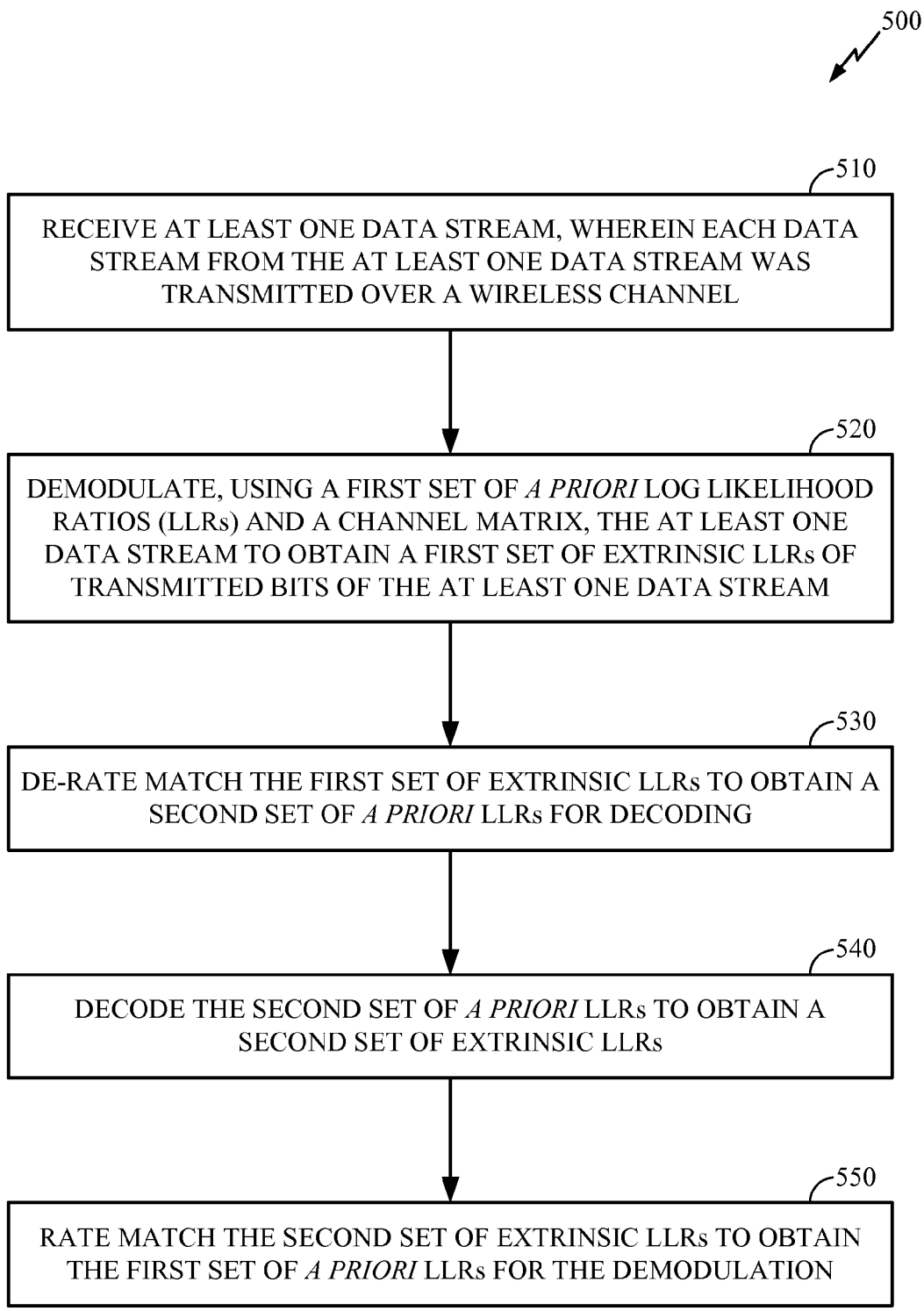
FIG. 5 illustrates example operations for unified iterative decoding in accordance with certain aspects of the present disclosure.

FIG. 4 illustrates an example receiver structure 400 based on iterative decoding that may be used within a wireless communication system 100. The iterative decoder 400 may be an integral part of the receiver 212 from FIG. 2. The proposed iterative decoder 400 is based on LLR extraction jointly performed by a demodulator 406 and a Turbo decoding unit 420. FIG. 5 illustrates example operations 500 for unified iterative decoding based on joint LLR extraction in accordance with certain aspects of the present disclosure.

At 510, at least one data stream transmitted over a wireless channel may be received at a receiver. The iterative receiver structure 400 may comprise the demodulator 406 and the Turbo decoding unit 420 that can be iteratively interfaced. A demodulation unit 404 may generate, at 520, a posteriori LLRs 410 of transmitted bits based on received samples 402 and based on a priori LLRs 408. Extrinsic LLRs 412 may be obtained by subtracting the a priori LLRs 408 from the a posteriori LLRs 410.

At 530, the extrinsic LLRs 412 may be processed by a de-rate matching (DRM) unit 414 to generate a priori LLRs 416 of an appropriate rate as input to the Turbo decoder 420. A Turbo decoding (TD) unit 418 may provide hard values of decoded bits 428. In order to improve error rate performance, outer feedback may be employed between the Turbo decoder 420 and the demodulator 406. At 540, the TD unit 418 may generate a posteriori LLRs 422 that represent soft values of transmitted bits of the at least one data stream, while extrinsic LLRs 424 may be obtained by subtracting the a priori LLRs 416 from the a posteriori LLRs 422. At 550, the extrinsic LLRs may be processed by a rate matching (RM) unit 426 to obtain the a priori LLRs 408 of an appropriate rate. The a priori LLRs 408 may be utilized by the demodulator 406 in the next iteration. LLRs related to systematic bits of the transmitted bits and LLRs related to parity bits may be extracted from the extrinsic LLRs 424. The extracted LLRs related to the systematic bits may be utilized for updating the first set of a priori LLRs 408 for the next processing iteration between the demodulator 406 and the decoder 420.

It can be noted that the proposed iterative decoder architecture 400 is different from the well-known hard/soft serial interference cancellation (SIC) architecture. The hard/soft SIC architecture may only be used for multiple-input multiple-output (MIMO) systems, while the proposed iterative decoding architecture may be used for both MIMO and single-input single-output (SISO) systems.

Important feature of the proposed iterative decoder 400 is that the extrinsic output 424 from the Turbo decoder 420 may become the a priori probability (APP) input 408 for the demodulator 406 for the next iteration. Similarly, the extrinsic output 412 from the demodulator 406 may become the APP input 416 for the Turbo decoder 420. For the very first iteration, no APP input may be available to the demodulator 406, and the LLR output 410 of the demodulator 406 may be equal to the extrinsic output 412.

A size of the transmitted at least one data stream (i.e., a transport block size: TBS) may be large, and therefore processing latency of the iterative receiver 400 may exceed a targeted timeline for achieving a desired data-rate. Certain aspects of the present disclosure support adaptively adjusting iteration parameters (e.g., a number of outer iterations between the demodulator 406 and the decoder 420, and a number of inner iterations of the decoder unit 418) based on the TBS.

Computation of Extrinsic Log Likelihood Ratios

Figure 6:
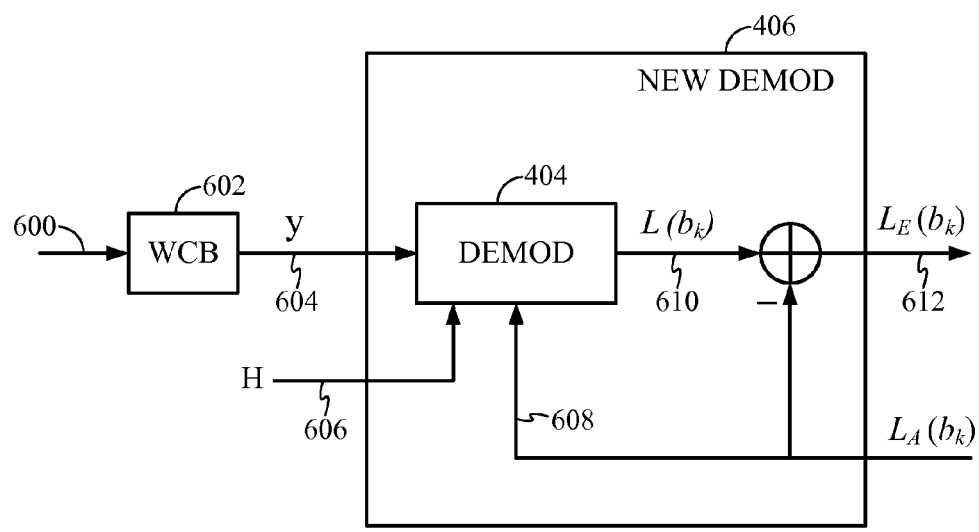
FIG. 6 illustrates an example block diagram of demodulator for computing extrinsic log-likelihood ratios in accordance with certain aspects of the present disclosure.

FIG. 6 illustrates an example block diagram of the demodulator 406 from FIG. 4 that may generate extrinsic LLRs in accordance with certain aspects of the present disclosure. A received signal 600 may be whitened and stored in a write controller buffer (WCB) unit 602. The stored whitened received signal 604 may represent an input into the demodulator 406. Another input in the demodulator 406 may be a matrix 606 of MIMO channel coefficients, and yet another input may be a priori LLRs 608 from the Turbo decoder 420 illustrated in FIG. 4. The demodulator unit 404 may generate a posteriori LLRs 610 of transmitted coded bits. Extrinsic LLRs 612 may be obtained by subtracting the a priori LLRs 608 from the a posteriori LLRs 610.

The system model may be represented as:

$$y = H \cdot x + n, \quad (1)$$

where x is a vector of transmitted symbols from one or more transmit antennas, y is the whitened signal 604, H is the matrix 606 of channel coefficients, and n is a noise vector. It can be assumed a MIMO wireless system, while a single stream wireless system and single-input single-output (SISO) wireless system may be considered as special cases of the MIMO wireless system.

The LLR output 610 for the bit $b_k$ from the vector of transmitted modulated symbols x may be written as:

$$L(b_k) = LLR(b_k \mid y) = \log\left(\frac{P(b_k = 0 \mid y)}{P(b_k = 1 \mid y)}\right) = \log\left(\frac{\sum_{x:b_k=0} P(x \mid y)}{\sum_{x:b_k=1} P(x \mid y)}\right) \quad (2)$$

$$= \log\left(\frac{\sum_{x:b_k=0} p(y \mid x) P(x)}{\sum_{x:b_k=1} p(y \mid x) P(x)}\right)$$

$$= \log\left(\frac{\sum_{x:b_k=0} p(y \mid x) P(b_k = 0) \prod_{i=1, i \neq k}^{N \cdot M} P(b_i = u_i)}{\sum_{x:b_k=1} p(y \mid x) P(b_k = 1) \prod_{j=1, j \neq k}^{N \cdot M} P(b_j = v_j)}\right)$$

$$= \underbrace{\log\left(\frac{\sum_{x:b_k=0} p(y \mid x) \prod_{i=1, i \neq k}^{N \cdot M} P(b_i = u_i)}{\sum_{x:b_k=1} p(y \mid x) \prod_{j=1, j \neq k}^{N \cdot M} P(b_j = v_j)}\right)}_{\text{Extrinsic}} + \underbrace{\log\left(\frac{P(b_k = 0)}{P(b_k = 1)}\right)}_{\text{APP}}$$

$$= L_E(b_k) + L_A(b_k),$$

where $L(b_k)$ represents the a posteriori LLR output of the demodulator, $L_A(b_k)$ is the APP LLR input to the demodulator, $L_E(b_k)$ is the extrinsic LLR output of the demodulator, N is a number of MIMO data streams, and M is a number of bits per modulation symbol. Variables $u_i$ and $v_j$ may be either 0 or 1, depending on the symbol vector x and the symbol-bit mapping relation. In addition, according to the definition of LLRs, the a priori probabilities may be written as:

$$P(b_i = 1) = \frac{1}{1 + \exp(L_A(b_i))}, \quad (3)$$

$$P(b_i = 0) = \frac{\exp(L_A(b_i))}{1 + \exp(L_A(b_i))}.$$

It can be observed from equation (2) that the a posteriori LLR output of the demodulator may be composed of two parts, the APP information and the extrinsic information. After combining equation (3) with equation (2) and after some manipulations, the extrinsic LLR for the bit $b_k$ may be written as:

$$L_E(b_k) = \log\left(\frac{\sum_{x:b_k=0} p(y|x)\exp\left(\prod_{i=1,i\neq k, b_i=0}^{N\cdot M} L_A(b_i)\right)}{\sum_{x:b_k=1} p(y|x)\exp\left(\prod_{j=1,j\neq k, b_j=0}^{N\cdot M} L_A(b_j)\right)}\right) \quad (4)$$

$$= \log\left(\frac{\sum_{x:b_k=0} \exp\left(-\frac{\|y-Hx\|^2}{\sigma_n^2} + \prod_{i=1,i\neq k, b_i=0}^{N\cdot M} L_A(b_i)\right)}{\sum_{x:b_k=1} \exp\left(-\frac{\|y-Hx\|^2}{\sigma_n^2} + \prod_{j=1,j\neq k, b_j=0}^{N\cdot M} L_A(b_j)\right)}\right),$$

where $\sigma_n^2$ is a noise variance.

It can be observed from equation (4) that each term that represents a distance between a received symbol y and a transmitted hypothesis x may be shifted by adding a priori probability (APP) LLRs. In addition, conversion of the APP LLRs into probabilities may not be required when utilizing the APP information.

The Max-Log MAP (MLM) solution may be obtained by replacing the sum operation in equation (4) by a maximum operation, as given by:

$$L_E(b_k) = \log\left(\frac{\sum_{x:b_k=0} \exp\left(-\frac{\|y-Hx\|^2}{\sigma_n^2} + \prod_{i=1,i\neq k, b_i=0}^{N\cdot M} L_A(b_i)\right)}{\sum_{x:b_k=1} \exp\left(-\frac{\|y-Hx\|^2}{\sigma_n^2} + \prod_{j=1,j\neq k, b_j=0}^{N\cdot M} L_A(b_j)\right)}\right) \quad (5)$$

$$\stackrel{MLM}{\approx} \log\left(\frac{\max_{x:b_k=0} \exp\left(-\frac{\|y-Hx\|^2}{\sigma_n^2} + \sum_{i=1,i\neq k, b_i=0}^{N\cdot M} L_A(b_i)\right)}{\max_{x:b_k=1} \exp\left(-\frac{\|y-Hx\|^2}{\sigma_n^2} + \sum_{j=1,j\neq k, b_j=0}^{N\cdot M} L_A(b_j)\right)}\right)$$

$$= \max_{x:b_k=0}\left(-\frac{\|y-Hx\|^2}{\sigma_n^2} + \sum_{i=1,i\neq k, b_i=0}^{N\cdot M} L_A(b_i)\right) -$$

$$\max_{x:b_k=1}\left(-\frac{\|y-Hx\|^2}{\sigma_n^2} + \sum_{j=1,j\neq k, b_j=0}^{N\cdot M} L_A(b_j)\right).$$

Full Slicing Operations with APP

It can be assumed, without loss of generality, a MIMO wireless system with two data streams. After subtracting interference from the first data stream for each hypothesis of $x_1$, a received signal z without interference from the first data stream may be written as:

$$z = y - h_1 \cdot x_1, \quad (6)$$

where $h_m$ is a channel from the $m^{th}$ MIMO stream (i.e., the $m^{th}$ transmit antenna) to all receive antennas.

The maximization from equation (5) for the second data stream $x_2$ may be written as:

$$\max_x\left(-\frac{\|y-Hx\|^2}{\sigma_n^2} + \sum_{i=1,i\neq k}^{N\cdot M} L_A(b_i)\right) = \max_{x_2}\left(-\frac{\|z-h_2 x_2\|^2}{\sigma_n^2} + \log Pr\{x_2\}\right), \quad (7)$$

where $Pr\{x_2\}$ is a priori probability that the constellation point $x_2$ is transmitted.

The maximization over $x_2$ may be decomposed into optimization over real and imaginary components of the constellation point, as given by:

$$x_2 = x_{2I} + jx_{2Q}, \quad (8)$$

$$x_{2I}^{opt} = \arg\max_{x_{2I}}\left\{-\frac{|h_2|^2}{\sigma_n^2}\cdot\left(x_{2I}^2 - 2x_{2I}\cdot\text{Re}\left\{\frac{h_2^H \cdot z}{|h_2|^2}\right\}\right) + \log Pr\{x_{2I}\}\right\}, \quad (9)$$

$$x_{2Q}^{opt} = \arg\max_{x_{2Q}}\left\{-\frac{|h_2|^2}{\sigma_n^2}\cdot\left(x_{2Q}^2 - 2x_{2Q}\cdot\text{Re}\left\{\frac{h_2^H \cdot z}{|h_2|^2}\right\}\right) + \log Pr\{x_{2Q}\}\right\}. \quad (10)$$

The optimization given by equation (7) may have computational complexity proportional to $O(2^M)$ because $x_2$ may take on $2^M$ possible values, where M is a number of bits per constellation symbol. By applying equations (9)-(10), the computational complexity may be reduced to $O(2^{M/2})$. Further reduction in computational complexity down to $O(\log 2^M)$ may be possible at the cost of additional approximations.

Simplified Slicing Operations Using Approximation

It can be assumed, without loss of generality, a wireless system with two different simultaneously transmitted data streams $x_1$ and $x_2$. The QR decomposition of the channel matrix H may be employed as $H = Q \cdot R$. After rotating the received signal with unitary matrix Q, the system model may be rewritten in more detailed format as:

$$\underbrace{\begin{bmatrix} y_1 \\ y_2 \end{bmatrix}}_{y} = \underbrace{\begin{bmatrix} h_{11} & h_{12} \\ 0 & h_{22} \end{bmatrix}}_{R} \cdot \underbrace{\begin{bmatrix} x_1 \\ x_2 \end{bmatrix}}_{x} + \underbrace{\begin{bmatrix} n_1 \\ n_2 \end{bmatrix}}_{n}. \quad (11)$$

For each hypothesis of the transmitted data stream $x_2$, the linear minimum mean squared error (LMMSE) estimate of the transmitted data stream $x_1$, denoted by $\hat{x}_1$, may be expressed as:

$$\hat{x}_1 = \frac{E\{|\sigma_1^2|\}}{E\{|\sigma_1^2|\}|h_{11}|^2 + \sigma_n^2} h_{11}^*(y_1 - h_{12}x_2 - h_{11}\bar{x}_1) + \bar{x}_1, \quad (12)$$

where $\bar{x}_1$ and $\sigma_1^2$ denote the mean and variance of a soft symbol of the transmitted data stream $x_1$, respectively. It can be assumed that soft symbols of the transmitted data streams follow Gaussian distribution. Then, $\hat{x}_1$ may be sliced to the nearest constellation point.

Unified Decoding

Certain aspects of the present disclosure support a unified architecture that may be employed for iterative decoding with joint LLR extraction in different wireless systems, including: a dual stream MIMO, a single stream MIMO, and a SISO wireless system. In general, inputs to the demodulator 406 may be: whitened received symbols y, a whitened channel matrix H and APP information for all transmitted bits $\{L_A(b_1) \ldots L_A(b_{NM})\}$, as illustrated in FIG. 6 and defined in equation (4).

In the case of dual stream MIMO system, the system model given by equation (1) may be written as:

$$y = h_1 x_1 + h_2 x_2 + n. \quad (13)$$

It can be observed from equation (12) that all previously defined demodulator inputs may be required.

In the case of single stream MIMO system, the system model given by equation (1) may be written as:

$$y=hx+n, \tag{14}$$

where the whitened symbols y may be the same as in the general case, H=[h 0] (i.e., only the first column is used), and APP information may only be defined for the first data stream: $\{L_A(b_1), \ldots, L_A(b_M), 0, \ldots 0\}$.

In the case of SISO system, the system model given by equation (1) may be written as:

$$y=hx+n, \tag{15}$$

where the whitened received symbols may be given as $$y = \begin{bmatrix} y \\ 0 \end{bmatrix},$$

the whitened channel may be defined as $$H = \begin{bmatrix} h & 0 \\ 0 & 0 \end{bmatrix},$$

and the APP information may be given as $\{L_A(b_1), \ldots, L_A(b_M), 0, \ldots 0\}$.

Therefore, different wireless systems, such as the dual stream MIMO system, the single stream MIMO system and the SISO system may share the same advanced iterative decoding architecture illustrated in FIG. 4.

Figure 5A:
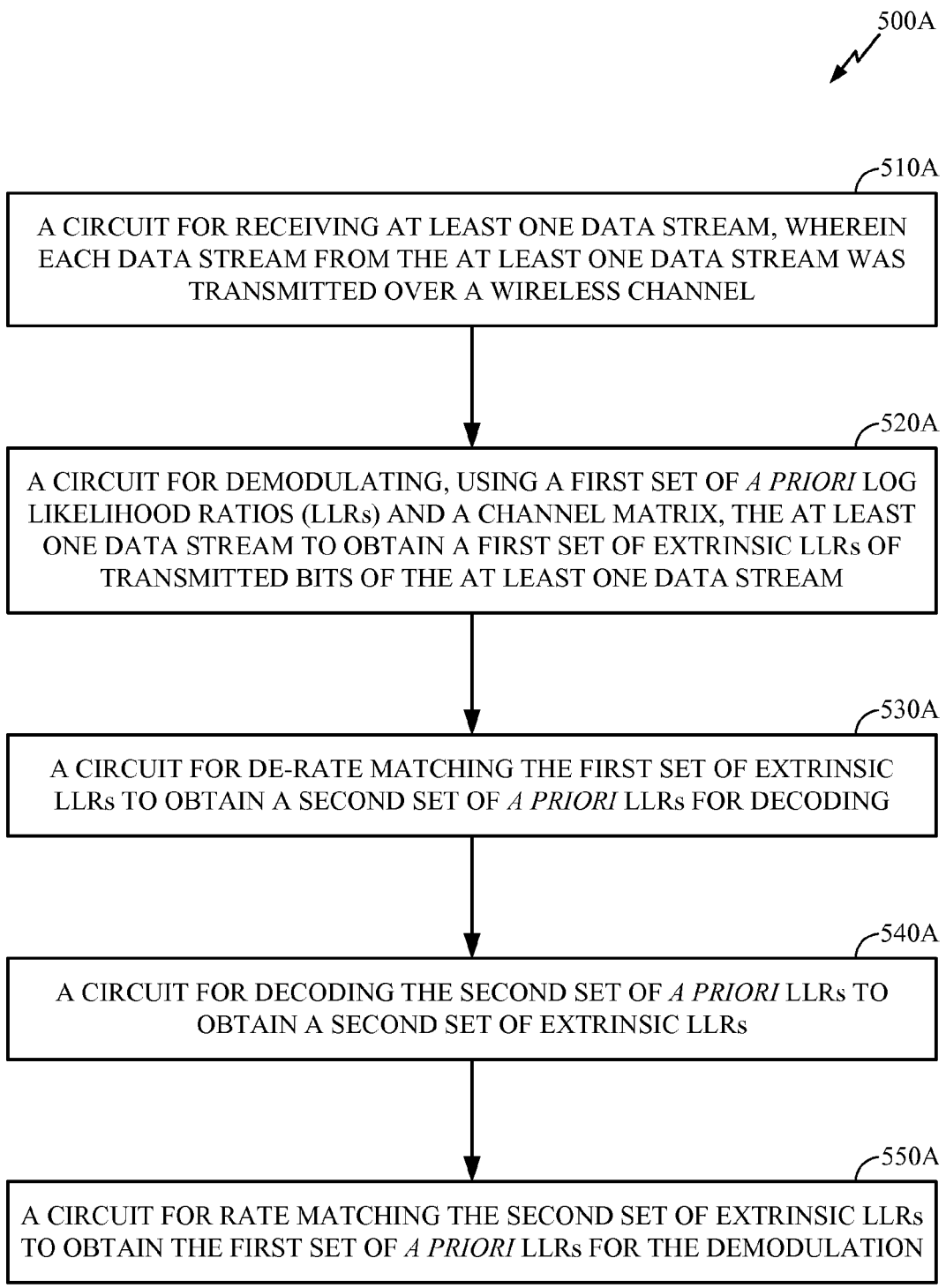
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 510-550 illustrated in FIG. 5 correspond to circuit blocks 510A-550A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, or other type of wireless device with processing logic and elements to perform the techniques provided herein.

The invention claimed is:

1. A method for wireless communications, the method comprising:
   receiving, at a receiver, a data stream communicated over a wireless channel;
   demodulating, at a demodulator, the data stream using a first set of a priori log likelihood ratios (LLRs) of transmitted bits of the data stream, a whitened data stream derived from the data stream, and an entry of a channel matrix to obtain a first set of extrinsic LLRs;
   processing, at a first processor, the first set of extrinsic LLRs to obtain a second set of a priori LLRs;
   decoding, at a decoder, the second set of a priori LLRs to obtain a second set of extrinsic LLRs; and
   processing, at a second processor, the second set of extrinsic LLRs to obtain a third set of a priori LLRs for subsequent demodulation,
   wherein the receiver, the demodulator, the first processor, the decoder, and the second processor correspond to a demodulation architecture, wherein the demodulation architecture is configured to process Multiple-Input-Multiple-Output (MIMO) data streams and Single-Input-Single-Output (SISO) data streams, wherein a particular set of a priori LLRs is determined based on one or more sets of entries of the channel matrix when one or more MIMO data streams are processed, and wherein the particular set of a priori LLRs is determined based on a single entry of the channel matrix when a SISO data stream is processed.

2. The method of claim 1, wherein processing the first set of extrinsic LLRs includes de-rate matching the first set of extrinsic LLRs, and wherein processing the second set of extrinsic LLRs includes rate matching the second set of extrinsic LLRs.

3. The method of claim 1, wherein receiving the data stream includes receiving at least two different data streams from at least two antennas, wherein each data stream of the at least two different data streams is received using a different antenna of the at least two antennas.

4. The method of claim 3, wherein decoding the second set of a priori LLRs includes parallel decoding of a priori LLRs that correspond to the at least two different data streams.

5. The method of claim 1, wherein receiving the data stream includes receiving one data stream using at least two antennas.

6. The method of claim 1, further comprising whitening the data stream to obtain the whitened data stream.

7. The method of claim 1, wherein the entry of the channel matrix is included in a column of the channel matrix.

8. The method of claim 1, wherein receiving the data stream includes receiving one data stream using at least one antenna.

9. The method of claim 1, wherein decoding the second set of a priori LLRs includes decoding the second set of a priori LLRs based on turbo decoding.

10. The method of claim 9, further comprising:
    extracting, from the second set of extrinsic LLRs after decoding the second set of a priori LLRs, LLRs related to systematic bits and LLRs related to parity bits; and
    using the extracted LLRs related to the systematic bits to update the first set of a priori LLRs for subsequent demodulation.

11. The method of claim 1, wherein the data stream includes a first data stream and a second data stream, wherein demodulating the data stream includes:
    estimating symbols of the first data stream utilizing at least a signal without interference from the second data stream and the first set of a priori LLRs based on a Max-Log maximum a posteriori (MLM) algorithm; and
    obtaining estimates of the transmitted bits based on the estimated symbols.

12. The method of claim 1, wherein the data stream includes a first data stream and a second data stream, wherein demodulating the data stream includes:
    estimating soft symbols of the first data stream utilizing hypotheses about the second data stream based on a version of a linear minimum mean square error (LMMSE) algorithm; and
    slicing the estimated soft symbols of the first data stream to obtain the estimates of the transmitted bits, wherein the version of the LMMSE algorithm is based on Gaussian distribution of the estimated soft symbols.

13. The method of claim 1, further comprising adjusting a number of iterations between demodulation and decoding based on a number of the transmitted bits of the data stream.

14. The method of claim 1, further comprising adjusting a number of iterations of decoding based on a number of the transmitted bits of the data stream.

15. The method of claim 1, wherein the receiver, the demodulator, the first processor, the decoder, and the second processor are components of a demodulation system, wherein the demodulation system has the demodulation architecture.

16. The method of claim 1, further comprising:
    determining the particular set of a priori LLRs for based on multiple columns of the channel matrix when multiple MIMO data streams are processed; and
    determining the particular set of a priori LLRs based on a first column of the channel matrix but not based on a second column of the channel matrix when a single MIMO data stream is processed.

17. The method of claim 1, wherein the one or more sets of entries of the channel matrix includes one or more columns of the channel matrix, and wherein the third set of a priori LLRs includes the particular set of a priori LLRs.

18. The method of claim 1, wherein a priori LLRs based on entries other than the single entry of the channel matrix are not determined when the SISO data stream is processed.

19. An apparatus for wireless communications, the apparatus comprising:
a receiver configured to receive a data stream communicated over a wireless channel;
a demodulator configured to demodulate the at least one data stream using a first set of a priori log likelihood ratios (LLRs) of transmitted bits of the data stream, a whitened data stream derived from the data stream, and an entry of a channel matrix to obtain a first set of extrinsic LLRs;
a first processor configured to process the first set of extrinsic LLRs to obtain a second set of a priori LLRs;
a decoder configured to decode the second set of a priori LLRs to obtain a second set of extrinsic LLRs; and
a second processor configured to process the second set of extrinsic LLRs to obtain a third set of a priori LLRs for subsequent demodulation,
wherein the receiver, the demodulator, the first processor, the decoder, and the second processor correspond to a demodulation architecture, wherein the demodulation architecture is configured to process Multiple-Input-Multiple-Output (MIMO) data streams and Single-Input-Single-Output (SISO) data streams, and wherein the demodulation architecture is configured to determine a particular set of a priori LLRs based on one or more sets of entries of the channel matrix when one or more MIMO data streams are processed and to determine the particular set of a priori LLRs based on a single entry of the channel matrix when a SISO data stream is processed.

20. The apparatus of claim 19, wherein the first processor includes a circuit configured to de-rate match the first set of extrinsic LLRs, and wherein the second processor includes a circuit configured to rate match the second set of extrinsic LLRs.

21. The apparatus of claim 19, wherein the receiver includes a circuit configured to receive at least two different data streams transmitted from at least two antennas, wherein each data stream of the at least two different data streams is received using a different antenna of the at least two antennas.

22. The apparatus of claim 21, wherein the decoder includes a circuit configured to perform parallel decoding of the a priori LLRs that correspond to the at least two different data streams.

23. The apparatus of claim 19, wherein the receiver includes a circuit configured to receive a particular data stream using at least two antennas.

24. The apparatus of claim 19, further comprising a whitening circuit configured to whiten the data stream to obtain the whitened data stream.

25. The apparatus of claim 19, wherein the entry of the channel matrix is included in a column of the channel matrix.

26. The apparatus of claim 19, wherein the receiver includes a circuit configured to receive a particular data stream using at least one antenna.

27. The apparatus of claim 19, wherein the decoder includes a circuit configured to decode the second set of a priori LLRs based on turbo decoding, and further comprising:
a first circuit configured to extract, from the second set of extrinsic LLRs after the decoder decodes the second set of a priori LLRs, LLRs related to systematic bits and LLRs related to parity bits; and
a second circuit configured to use the extracted LLRs related to the systematic bits to update the first set of a priori LLRs for subsequent demodulation.

28. The apparatus of claim 19, wherein the data stream includes a first data stream and a second data stream, wherein the demodulator includes:
an estimator configured to estimate symbols of the first data stream utilizing at least a signal without interference from the second data stream and the first set of a priori LLRs based on a Max-Log maximum a posteriori (MLM) algorithm; and
a circuit configured to obtain estimates of the transmitted bits based on the estimated symbols.

29. The apparatus of claim 19, wherein the data stream includes a first data stream and a second data stream, wherein the demodulator includes:
an estimator configured to estimate soft symbols of the first data stream utilizing hypotheses about the second data stream based on a version of a linear minimum mean square error (LMMSE) algorithm; and
a slicer configured to slice the estimated soft symbols of the first data stream to obtain estimates of the transmitted bits, wherein the version of the LMMSE algorithm is based on a Gaussian distribution of the estimated soft symbols.

30. The apparatus of claim 19, further comprising a circuit configured to adjust a number of iterations between demodulation and decoding based on a number of the transmitted bits of the data stream.

31. The apparatus of claim 19, further comprising a circuit configured to adjust a number of iterations of decoding based on a number of the transmitted bits of the data stream.

32. An apparatus for wireless communications, the apparatus comprising:
means for receiving a data stream communicated over a wireless channel;
means for demodulating the data stream using a first set of a priori log likelihood ratios (LLRs) of transmitted bits of the data stream, a whitened data stream derived from the data stream, and an entry of a channel matrix to obtain a first set of extrinsic LLRs;
means for processing the first set of extrinsic LLRs to obtain a second set of a priori LLRs;
means for decoding the second set of a priori LLRs to obtain a second set of extrinsic LLRs; and
means for processing the second set of extrinsic LLRs to obtain a third set of a priori LLRs for subsequent demodulation,
wherein the means for receiving, the means for demodulating, the means for processing the first set, the means for decoding, and the means for processing a second set correspond to a demodulation architecture, wherein the demodulation architecture is configured to process Multiple-Input-Multiple-Output (MIMO) data streams and Single-Input-Single-Output (SISO) data streams, and wherein the demodulation architecture is configured to determine a particular set of a priori LLRs based on one or more sets of entries of the channel matrix when one or more MIMO data streams are processed and to determine the particular set of a priori LLRs based on a single entry of the channel matrix when a SISO data stream is processed.

33. A non-transitory computer readable medium comprising processor-executable instructions that, when executed by a processor, cause the processor to:
direct a receiver to receive a data stream communicated over a wireless channel;

demodulate the data stream using a first set of a priori log likelihood ratios (LLRs) of transmitted bits of the data stream, a whitened data stream derived from the data stream, and an entry of a channel matrix to obtain a first set of extrinsic LLRs;

process the first set of extrinsic LLRs to obtain a second set of a priori LLRs;

decode the second set of a priori LLRs to obtain a second set of extrinsic LLRs; and process the second set of extrinsic LLRs to obtain a third set of a priori LLRs for subsequent demodulation, wherein the receiver and the processor correspond to a demodulation architecture, wherein the demodulation architecture is configured to process Multiple-Input-Multiple-Output (MIMO) data streams and Single-Input-Single-Output (SISO) data streams, wherein a particular set of a priori LLRs is determined based on one or more sets of entries of the channel matrix when one or more MIMO data streams are processed, and wherein the particular set of a priori LLRs is determined based on a single entry of the channel matrix when a SISO data stream is processed.

34. A wireless node comprising:

a receiver configured to receive, via at least one antenna, a data stream communicated over a wireless channel;

a demodulator configured to demodulate the data stream using a first set of a priori log likelihood ratios (LLRs) of transmitted bits of the data stream, a whitened data stream derived from the data stream, and an entry of a channel matrix to obtain a first set of extrinsic LLRs;

a first processor configured to process the first set of extrinsic LLRs to obtain a second set of a priori LLRs for decoding;

a decoder configured to decode the second set of a priori LLRs to obtain a second set of extrinsic LLRs; and a second processor configured to process the second set of extrinsic LLRs to obtain a third set of a priori LLRs for subsequent demodulation, wherein the receiver, the demodulator, the first processor, the decoder, and the second processor correspond to a demodulation architecture, wherein the demodulation architecture is configured to process Multiple-Input-Multiple-Output (MIMO) data streams and Single-Input-Single-Output (SISO) data streams, and wherein the demodulation architecture is configured to determine a particular set of a priori LLRs based on one or more sets of entries of the channel matrix when one or more MIMO data streams are processed and to determine the particular set of a priori LLRs based on a single entry of the channel matrix when a SISO data stream is processed.

* * * * *